United States Patent
Dix et al.

(10) Patent No.: US 10,031,525 B2
(45) Date of Patent: Jul. 24, 2018

(54) SWATH TRACKING SYSTEM FOR AN OFF-ROAD VEHICLE

(71) Applicants: CNH Industrial America LLC, New Holland, PA (US); Autonomous Solutions, Inc., Mendon, UT (US)

(72) Inventors: Peter John Dix, Naperville, IL (US); Brett Carson McClelland, Chicago, IL (US); Brendan Paul McCarthy, Willowbrook, IL (US); Brian Robert Ray, Chicago, IL (US); Nathan Eric Bunderson, Providence, UT (US); Robert Dean Ashby, Collinston, UT (US); John Arthur Mitsuru Petersen, Providence, UT (US); Daniel John Morwood, Petersboro, UT (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 15/179,753

(22) Filed: Jun. 10, 2016

(65) Prior Publication Data

US 2017/0357262 A1    Dec. 14, 2017

(51) Int. Cl.
    *G05D 1/02*     (2006.01)
    *G01S 19/13*    (2010.01)
    *A01B 69/04*    (2006.01)

(52) U.S. Cl.
    CPC ......... *G05D 1/0212* (2013.01); *A01B 69/008* (2013.01); *G01S 19/13* (2013.01);
    (Continued)

(58) Field of Classification Search
    CPC .. G05D 1/0212; G05D 1/0231; G05D 1/0278; G05D 2201/0201
    See application file for complete search history.

(56) References Cited

U.S. PATENT DOCUMENTS 3,118,266 A * 1/1964 Colburn ............... A01D 34/661
                                            56/10.6
5,555,503 A * 9/1996 Kyrtsos ................. G08G 1/202
                                            342/357.24
(Continued)

FOREIGN PATENT DOCUMENTS

WO      2005119386 A1     12/2005

OTHER PUBLICATIONS

U.S. Appl. No. 14/995,923, filed Jan. 14, 2016, Nathan Eric Bunderson.

(Continued)

*Primary Examiner* — Anne M Antonucci
(74) *Attorney, Agent, or Firm* — Rebecca L. Henkel; Rickard K. DeMille

(57) ABSTRACT

A swath tracking system for an off-road vehicle includes a control system with a processor and a memory. The control system is configured to receive a plurality of vehicle location points and a current vehicle state, wherein the current vehicle state comprises a current vehicle location, generate a planned vehicle path through one or more of the plurality of vehicle location points, generate a correction path from the current vehicle location to a point along the planned vehicle path ahead of the current vehicle location along a direction of travel, generate a blended path by blending the planned vehicle path and the correction path based at least in part on an assigned weight, wherein the assigned weight is based at least in part on a heading error, a distance between the current vehicle location and the planned path, or a combination thereof, and guide the off-road vehicle along the blended path.

20 Claims, 5 Drawing Sheets

(52) U.S. Cl.
CPC ......... *G05D 1/0231* (2013.01); *G05D 1/0278* (2013.01); *G05D 2201/0201* (2013.01)

(56) References Cited

U.S. PATENT DOCUMENTS

| | | | |
|---|---|---|---|
| 7,451,029 | B2 | 11/2008 | McLaren et al. |
| 7,580,783 | B2 | 8/2009 | Dix |
| 7,591,226 | B2 | 9/2009 | Dix et al. |
| 7,689,656 | B2 | 3/2010 | McCarthy et al. |
| 7,706,948 | B2 | 4/2010 | Dix et al. |
| 7,715,966 | B2 | 5/2010 | Dix et al. |
| 7,715,979 | B2 | 5/2010 | Dix |
| 7,747,370 | B2 | 6/2010 | Dix |
| 7,860,592 | B2 | 12/2010 | Kimura et al. |
| 7,877,182 | B2 | 1/2011 | Dix et al. |
| 7,904,226 | B2 | 3/2011 | Dix |
| 8,060,269 | B2 | 11/2011 | Dix |
| 8,145,390 | B2 | 3/2012 | Dix et al. |
| 8,296,052 | B2 | 10/2012 | Dix et al. |
| 8,359,139 | B2 | 1/2013 | Wang et al. |
| 8,565,978 | B2 | 10/2013 | Elkins et al. |
| 8,606,498 | B2 | 12/2013 | Pesterev et al. |
| 8,725,474 | B2 | 5/2014 | Dorum et al. |
| 9,020,757 | B2* | 4/2015 | Peake .................. B62D 15/025 180/204 |
| 2003/0100992 | A1* | 5/2003 | Khosla .................. G01C 21/26 701/514 |
| 2005/0230166 | A1* | 10/2005 | Petersson ............. A01D 34/008 180/170 |
| 2005/0236201 | A1* | 10/2005 | Spannheimer ..... B62D 15/0285 180/204 |
| 2006/0178823 | A1 | 8/2006 | Eglington et al. |
| 2008/0215203 | A1 | 9/2008 | Dix et al. |
| 2009/0118904 | A1 | 5/2009 | Birnie |
| 2011/0125811 | A1 | 5/2011 | Witmer |
| 2011/0231057 | A1 | 9/2011 | Ashjaee et al. |
| 2012/0190386 | A1* | 7/2012 | Anderson .............. G01C 15/04 455/456.3 |
| 2013/0304300 | A1* | 11/2013 | Peake .................. B62D 15/025 701/23 |
| 2014/0236482 | A1 | 8/2014 | Dorum et al. |
| 2016/0057921 | A1 | 3/2016 | Pickett et al. |

OTHER PUBLICATIONS

U.S. Appl. No. 15/098,131, filed Apr. 13, 2016, Nathan Eric Bunderson.

Choi et al; "Piecewise Bezier Curves Path Planning with Continuous Curvature Constraint for Autonomous Driving;" Machine Learning and Systems Engineering, Lecture Notes in Electrical Engineering; 2010, pages 31-45.

Cariou et al; "Maneuvers automation for agricultural vehicle in headland;" AgEng 2010, International Conference on Agricultural Engineering; Sep. 2010, 11 pages.

Girbes et al; "On generating continuous-curvature paths for line following problem with curvature and sharpness constraints;" Conference Paper in Proceedings—IEEE International Conference on Robotics and Automation; Jun. 2011, 7 pages.

International Search Report and Written Opinion for PCT/US2017/036612; dated Oct. 5, 2017; 10 pages.

\* cited by examiner

SWATH TRACKING SYSTEM FOR AN OFF-ROAD VEHICLE

BACKGROUND

The disclosure relates generally to off-road vehicle guidance systems, and more particularly to a swath tracking system for an off-road vehicle.

Off-road vehicles, such as agricultural tractors, are typically manually guided through a field (e.g., via input from a driver). That is, an operator controls the steering and speed of an off-road vehicle from within a cab. Recent developments integrating GPS-based navigation systems into agricultural vehicle control systems have enabled automatic or semi-automatic steering modes. For example, some agricultural vehicles may include a control system configured to automatically direct the vehicle to follow a path between, over, or adjacent to rows in a field. The strip formed by the width of the vehicle and/or implement as the vehicle follows the path may be referred to as a swath. Unfortunately, for a variety of reasons, the vehicle may diverge from or move off the planned path.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a swath tracking system for an off-road vehicle includes a control system with a processor and a memory. The control system is configured to receive a plurality of vehicle location points and a current vehicle state, wherein the current vehicle state comprises a current vehicle location, generate a planned vehicle path through one or more of the plurality of vehicle location points, generate a correction path from the current vehicle location to one of the plurality of vehicle location points along the planned vehicle path ahead of the current vehicle location along a direction of travel, generate a blended path by blending the control signals of the planned vehicle path and the correction path based at least in part on an assigned weight, wherein the assigned weight is based at least in part on a heading error, a distance between the current vehicle location and the planned path, or a combination thereof, and guide the off-road vehicle, according to the blended control signals, along the blended path.

In another embodiment, an off-road vehicle includes a steering control system, a speed control system, a spatial locating device, and a control system. The steering control system is configured to control a direction of travel of the off-road vehicle. The speed control system is configured to control a speed of travel of the off-road vehicle. The spatial locating device is configured to determine a current vehicle state of the off-road vehicle. The control system is configured to receive a plurality of vehicle location points, generate a planned vehicle path through one or more of the plurality of vehicle location points, receive the current vehicle state from the spatial locating device, wherein the current vehicle state comprises a current vehicle location, generate a correction path from a current vehicle location to one of the plurality of vehicle location points along the planned vehicle path ahead of the current vehicle location along a direction of travel, generate a blended path by blending the control signals of the planned vehicle path and the correction path based at least in part on an assigned weight, wherein the assigned weight is based at least in part on heading error, a distance between the current vehicle location and the planned path, or a combination thereof, and control the steering control system and the speed control system to guide the off-road vehicle along the blended path.

In a further embodiment, a method includes receiving a plurality vehicle location points, a current vehicle state, and a feedback loop delay time, wherein the current vehicle state comprises a current vehicle location, generating a planned vehicle path through one or more of the plurality vehicle location points, generating a correction path from the current vehicle location to one of the plurality of vehicle location points along the planned vehicle path ahead of the current vehicle location along a direction of travel, generating a blended path by blending the planned vehicle path and the correction path based at least in part on an assigned weight, wherein the assigned weight is based at least in part on heading error, a distance between the current vehicle location and the planned path, or a combination thereof, and guiding the off-road vehicle along the blended path.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
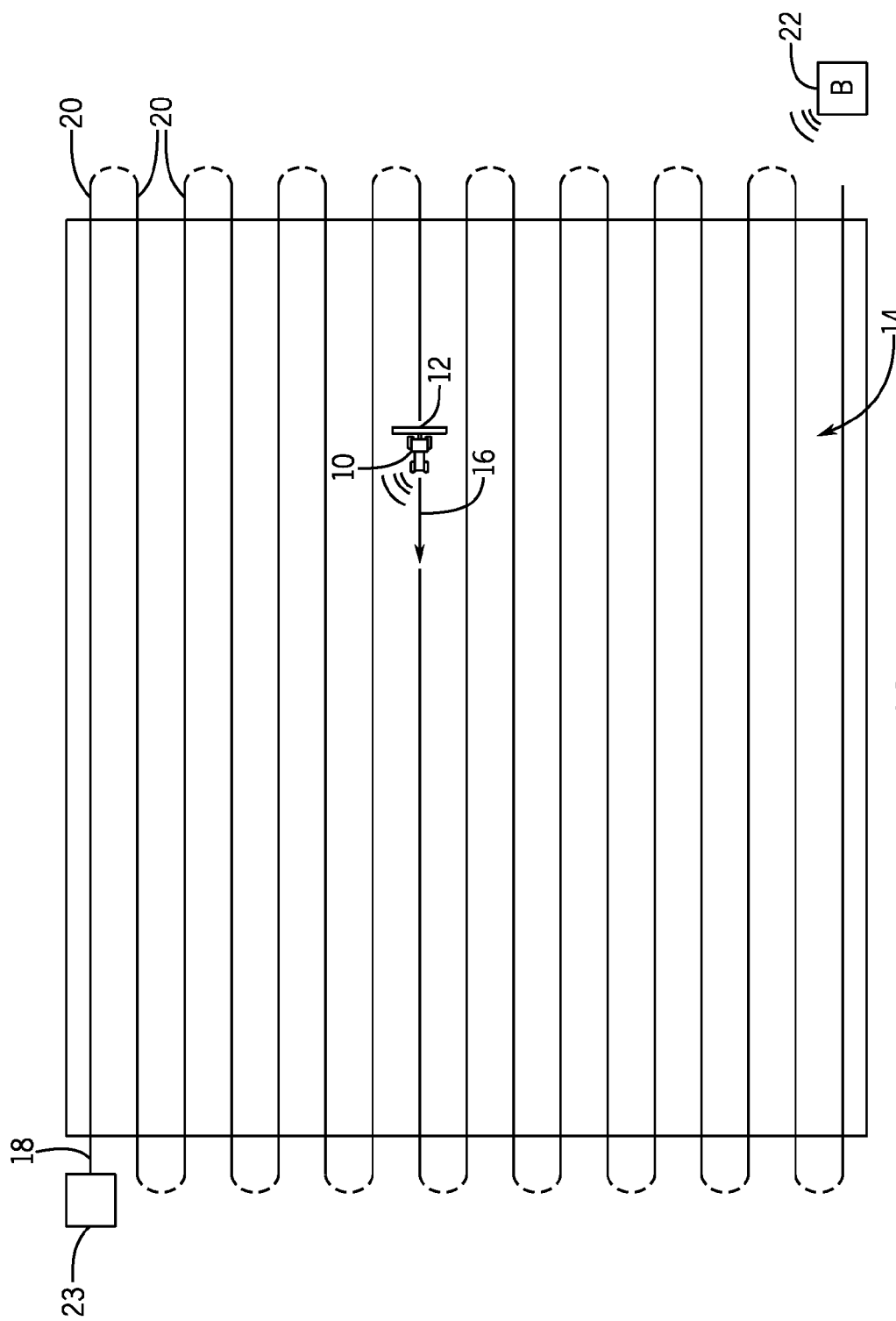
FIG. 1 is a schematic diagram of an embodiment of an off-road vehicle and an agricultural implement within an agricultural field.

FIG. 1 is a schematic diagram of an embodiment of an off-road vehicle 10 and an agricultural implement 12 within an agricultural field 14. The off-road vehicle 10 (e.g., tractor or other prime mover) is configured to tow the agricultural implement 12 throughout the field 14 along a direction of travel 16. In certain embodiments, the off-road vehicle 10 is directed (e.g., via an automated system) along a path 18 to traverse the field 14 along substantially parallel rows 20. As the vehicle 10 tows the implement 12 through the field 14 along the path, the width of the implement 12 covers a swath through the field. In alternative embodiments, the off-road vehicle 10 may be directed to traverse the field 14 along other routes (e.g., along a spiral path, etc.). As will be appreciated, the agricultural implement 12 may be any suitable implement for performing agricultural operations throughout the field 14. For example, in certain embodiments, the agricultural implement 12 may be a tillage tool, a fertilizer application tool, a seeding or planting tool, or a harvesting tool, among others. While the agricultural implement 12 is towed by the off-road vehicle 10 in the illustrated embodiment, it should be appreciated that in alternative embodiments, the agricultural implement 12 may be integrated within the off-road vehicle 10.

In certain embodiments, the off-road vehicle 10 is configured to operate autonomously (e.g., without an operator present in the cab of the off-road vehicle 10). Accordingly, an automatic system may direct the off-road vehicle 10 and agricultural implement 12 along the path 18 throughout the field 14 without direct control by an operator. In such embodiments, the autonomous off-road vehicle 10 may be configured to communicate with a base station 22. For example, in some embodiments, the off-road vehicle 10 may receive data associated with the path 18 (e.g., a series of points or a curve) from the base station 22.

Furthermore, in certain embodiments, the off-road vehicle 10 may be configured to operate semi-autonomously. For example, an operator within the cab may direct the off-road vehicle 10 to a starting position 23 within or proximate to the field 14, and an automated system may direct the off-road vehicle 10 along the selected/planned route (e.g., the path 18) through the field 14 while the operator monitors operation of the off-road vehicle 10 and/or the implement 12.

During operation, the off-road vehicle 10 may diverge from the planned path 18 or swath. This divergence may be due to operator inputs, geographical features in the field 14, an obstacle in the field 14, changes in the off-road vehicle's operation due to various field conditions (mud, slippery ground, large clods of dirt, etc.), and the like. In other instances, the operator may move the planned path to better align with existing rows or other physical features in the field. Accordingly, the off-road vehicle 10 may attempt to return itself to the planned path 18. For example, in some embodiments, the off-road vehicle 10 may generate a correction path from its current position to a point along the path 18. The off-road vehicle 10 may then blend the planned path 18 and the correction path by blending the control signals for each path, weighting each based on error (e.g., how far the off-road vehicle 10 has diverged from the planned path 18, or an error in vehicle heading) to create a blended path. The off-road vehicle may then follow the blended path back to the planned path 18, and continue along the planned path 18.

Figure 2:
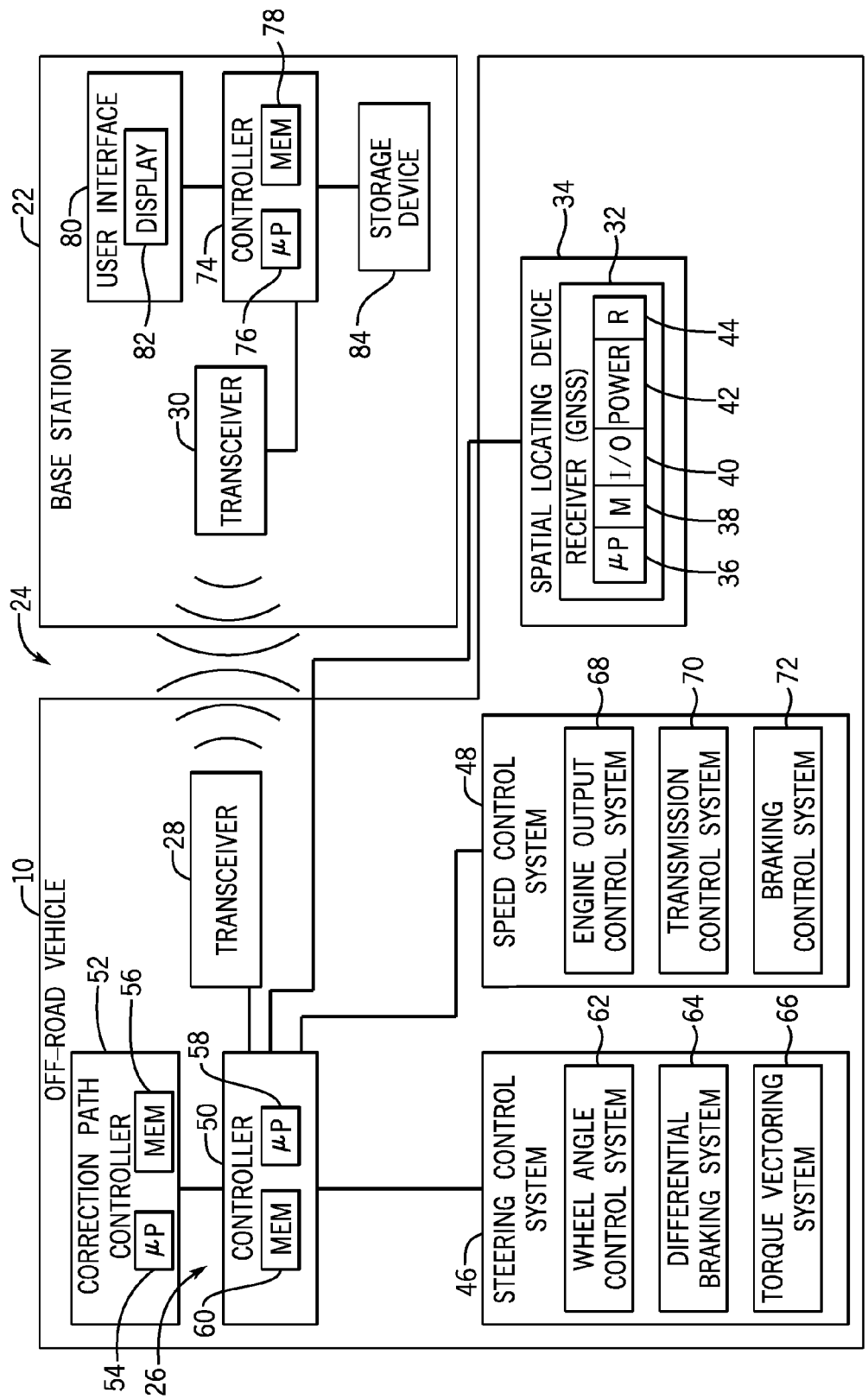
FIG. 2 is a schematic diagram of an embodiment of a swath tracking system that may be utilized to control the off-road vehicle of FIG. 1.

FIG. 2 is a schematic diagram of an embodiment of a swath tracking system 24 that may be utilized to control the off-road vehicle 10 of FIG. 1. In the illustrated embodiment, the swath tracking system 24 includes a primary control system 26 (e.g., mounted on the off-road vehicle 10), and the off-road vehicle 10 includes a first transceiver 28 configured to establish a wireless communication link with a second transceiver 30 of the base station 22. As will be appreciated, the first and second transceivers 28, 30 may operate at any suitable frequency range within the electromagnetic spectrum. For example, in certain embodiments, the transceivers 28, 30 may broadcast and receive radio waves within a frequency range of about 1 GHz to about 10 GHz. In addition, the first and second transceivers 28, 30 may utilize any suitable communication protocol, such as a standard protocol (e.g., Wi-Fi, Bluetooth, etc.) or a proprietary protocol.

In the illustrated embodiment, the off-road vehicle 10 includes a spatial locating device 34, which is mounted to the off-road vehicle 10 and configured to determine a position of the off-road vehicle 10. As will be appreciated, the spatial locating device 34 may include any suitable system configured to determine the position of the off-road vehicle 10, such as a global positioning system (GPS) or Global Navigation Satellite System (GLONASS), for example. The spatial locating device 34 is in communication with the primary vehicle control system 26. The spatial locating device 34 may include a Global Navigation Satellite System (GNSS) receiver 32 configured to communicate with two or more satellites in orbit (e.g., GPS, GLONASS, Galileo, BeiDou, etc.) to determine the location, heading, speed, etc. of the vehicle 10. The receiver 32 may include one or more micro-processors 36, a memory component 38, an input/output system 40, a power supply 42, and radio circuitry 44. The processors 36 may run software stored on the memory component 38 to compute the position of the vehicle 10. Based on the computed position over time, the processor 36 may also determine vehicle 10 heading, speed, etc. In some embodiments, the spatial locating device 34 may include a three-dimensional imaging system, such as a Lidar, which may be used in conjunction with the GNSS and configured to assist in determining a desired path and determining the vehicle's position and orientation relative to the path. Additionally, the spatial locating device 34 may include an augmentation system, such as Real Time Kinematic (RTK) or Wide Area Augmentation System (WAAS) to improve the accuracy of the spatial locating device 34.

In certain embodiments, the spatial locating device 34 may be configured to determine the position of the off-road vehicle 10 relative to a fixed point within the field (e.g., via a fixed radio transceiver 30). Accordingly, the spatial locating device 34 may be configured to determine the position of the off-road vehicle 10 relative to a fixed global coordinate system (e.g., via the GPS) or a fixed local coordinate system. In certain embodiments, the first transceiver 28 is configured to broadcast a signal indicative of the position of the off-road vehicle 10 to the transceiver 30 of the base station 22. Based on the determined location of the off-road vehicle 10, the control system 26 may determine (e.g., via a processor) the relative proximity to one or more rows or swaths, one or more boundaries, one or more headlands, etc. Furthermore, the control system 26 may determine a planned path through points or curves received from the base station 22, and/or a correction path from the vehicle's current position back to the planned path 18.

In the illustrated embodiment, the off-road vehicle 10 includes a steering control system 46 configured to control a direction of movement of the off-road vehicle 10, and a speed control system 48 configured to control a speed of the off-road vehicle 10. Furthermore, the control system 26 includes a controller 50 communicatively coupled to the first transceiver 28, to the spatial locating device 34, to the steering control system 46, and to the speed control system 48. In certain embodiments, the controller 50 may control the steering control system 46 and the speed control system 58 to guide the off-road vehicle 10 along the planned path.

In further embodiments, the controller 50 is configured to control the steering control system 46 and the speed control system 58 to guide the off-road vehicle 10 along a blended path that combines the control signals of the correction path received from a correction path controller 52 and the planned path generated by the controller 50 through the points or curves received from the base station 22. The correction path controller 52 is configured to receive the current vehicle state (e.g., position, velocity, heading, curvature, etc.), the planned path, and an estimated delay time of the control loop (e.g., to estimate the state of the vehicle when the vehicle actuates changes in the control signals). The correction path controller 52 may operate continuously to determine whether the vehicle 10 is off the planned path. If so, the correction path controller 52 determines an error (e.g., a distance between the planned path and the current vehicle 10 position or a heading error) and generates a continuous path for the vehicle 10 to follow to a point along the planned path. The controller 50 blends the corrected path received from the correction path controller 52 and the planned path through points or curves received from the base station 22 using a weight based on the error (e.g., by blending the control signals of the planned path and the correction path). The controller 50 controls the steering control system 46 and the speed control system 58 to guide the off-road vehicle 10 along the blended path. It should be appreciated that the blended path may not be mathematically defined, but is rather a result of directing the vehicle 10 using a control signal that blends the control signals for the planned path and the correction path.

The correction path controller 52 includes a processor, such as the illustrated microprocessor 54, and a memory device 56. The correction path controller 52 may also include one or more storage devices and/or other suitable components. The processor 54 may be used to execute software, such as software for generating a correction path, and so forth. The processor 54 may include multiple microprocessors, one or more "general-purpose" microprocessors, one or more special-purpose microprocessors, and/or one or more application specific integrated circuits (ASICS), or some combination thereof. For example, the processor 54 may include one or more reduced instruction set (RISC) processors. The memory device 56 may include a volatile memory, such as random access memory (RAM), and/or a nonvolatile memory, such as ROM. The memory device 56 may store a variety of information and may be used for various purposes. For example, the memory device 56 may store processor-executable instructions (e.g., firmware or software) for the processor 54 to execute, such as instructions for generating a correction path. The storage device(s) (e.g., nonvolatile storage) may include ROM, flash memory, a hard drive, or any other suitable optical, magnetic, or solid-state storage medium, or a combination thereof. The storage device(s) may store data (e.g., target points, the planned path, etc.), instructions (e.g., software or firmware for controlling the off-road vehicle, etc.), and any other suitable data. In some embodiments, the tasks of the correction path controller 52 and the primary controller 50 may be performed by a single controller (e.g., the primary controller 50).

In certain embodiments, the controller 50 is an electronic controller having electrical circuitry configured to process data from the transceiver 28, the spatial locating device 34, the correction path controller 52, or a combination thereof, among other components of the off-road vehicle 10. In the illustrated embodiment, the controller 50 includes a processor, such as the illustrated microprocessor 58, and a memory device 60. The controller 50 may also include one or more storage devices and/or other suitable components. The processor 58 may be used to execute software, such as software for controlling the off-road vehicle 10, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random access memory (RAM), and/or a nonvolatile memory, such as ROM. The memory device 60 may store a variety of information and may be used for various purposes. For example, the memory device 60 may store processor-executable instructions (e.g., firmware or software) for the processor 54 to execute, such as instructions for controlling the off-road vehicle 10. The storage device(s) 60 (e.g., nonvolatile storage) may include read-only memory (ROM), flash memory, a hard drive, or any other suitable optical, magnetic, or solid-state storage medium, or a combination thereof. The storage device(s) 60 may store data (e.g., target points, vehicle paths, etc.), instructions (e.g., software or firmware for controlling the off-road vehicle, etc.), and any other suitable data.

In the illustrated embodiment, the steering control system 46 includes a wheel angle control system 62, a differential braking system 64, and a torque vectoring system 66. The wheel angle control system 62 may automatically rotate one or more wheels or tracks of the off-road vehicle 10 (e.g., via hydraulic actuators) to steer the off-road vehicle 10 along the determined path through the field. By way of example, the wheel angle control system 62 may rotate front wheels/tracks, rear wheels/tracks, and/or intermediate wheels/tracks of the off-road vehicle 10, either individually or in groups. The differential braking system 64 may independently vary the braking force on each lateral side of the off-road vehicle 10 to direct the off-road vehicle 10 along the determined path through the field. Similarly, the torque vectoring system 66 may differentially apply torque from the engine to wheels and/or tracks on each lateral side of the off-road vehicle 10, thereby directing the off-road vehicle 10 along the determined path through the field. While the illustrated steering control system 46 includes the wheel angle control system 62, the differential braking system 64, and the torque vectoring system 66, it should be appreciated that alternative embodiments may include one or two of these systems, in any suitable combination. Further embodiments may include a steering control system having other and/or additional systems to facilitate directing the off-road vehicle 10 along the determined path through the field (e.g., an articulated steering system, etc.).

In the illustrated embodiment, the speed control system 48 includes an engine output control system 68, a transmission control system 70, and a braking control system 72. The engine output control system 68 is configured to vary the output of the engine to control the speed of the off-road vehicle 10. For example, the engine output control system 68 may vary a throttle setting of the engine, a fuel/air mixture of the engine, a timing of the engine, or a combination thereof, and/or other suitable engine parameters to control engine output. In addition, the transmission control system 70 may adjust gear selection within a transmission to control the speed of the off-road vehicle 10. Furthermore, the braking control system 72 may adjust braking force, thereby controlling the speed of the off-road vehicle 10. While the illustrated speed control system 48 includes the engine output control system 68, the transmission control system 70, and the braking control system 72, it should be appreciated that alternative embodiments may include one or two of these systems, in any suitable combination. Further embodiments may include a speed control system 48 having other and/or additional systems to facilitate adjusting the speed of the off-road vehicle.

As previously discussed, the off-road vehicle 10 is configured to communicate with the base station 22 via the transceivers 28, 30. In the illustrated embodiment, the base station 22 includes a controller 74 communicatively coupled to the base station transceiver 30. The controller 74 is configured to output commands and/or data to the off-road vehicle 10. For example, the controller 74 may provide a series of points or curves to the off-road vehicle 10 via the transceivers 28, 30, from which the vehicle generates a planned path.

In certain embodiments, the controller 74 is an electronic controller having electrical circuitry configured to process data from certain components of the base station 22 (e.g., the transceiver 30). In the illustrated embodiment, the controller 74 includes a processor, such as the illustrated microprocessor 76, and a memory device 78. The processor 76 may be used to execute software, such as software for providing commands and/or data to the off-road vehicle controller 50, and so forth. Moreover, the processor 76 may include multiple microprocessors, one or more "general-purpose" microprocessors, one or more special-purpose microprocessors, and/or one or more application specific integrated circuits (ASICS), or some combination thereof. For example, the processor 76 may include one or more reduced instruction set (RISC) processors. The memory device 78 may include a volatile memory, such as random access memory (RAM), and/or a nonvolatile memory, such as read-only memory (ROM). The memory device 78 may store a variety of information and may be used for various purposes. For example, the memory device 78 may store processor-executable instructions (e.g., firmware or software) for the processor 76 to execute, such as instructions for providing commands and/or data to the off-road vehicle controller 50.

In the illustrated embodiment, the base station 22 includes a user interface 80 communicatively coupled to the controller 74. The user interface 80 is configured to present data from the off-road vehicle 10 and/or the agricultural implement to an operator (e.g., data associated with operation of the off-road vehicle, data associated with operation of the agricultural implement, etc.). The user interface 80 is also configured to enable an operator to control certain functions of the off-road vehicle 10 (e.g., starting and stopping the off-road vehicle, instructing the off-road vehicle to follow a selected/planned route through the field, etc.). In the illustrated embodiment, the user interface includes a display 82 configured to present information to the operator, such as the position of the off-road vehicle 10 within the field, the speed of the off-road vehicle, and the path of the off-road vehicle, among other data. In addition, the user interface 80 (e.g., via the display 82, via an audio system, etc.) is configured to alert an operator if the vehicle 10 substantially diverges from the planned path.

In the illustrated embodiment, the base station 22 includes a storage device 84 communicatively coupled to the controller 74. The storage device 84 (e.g., nonvolatile storage) may include read-only memory (ROM), flash memory, a hard drive, or any other suitable optical, magnetic, or solid-state storage medium, or a combination thereof. The storage devices 84 may store data (e.g., field maps, planned paths or vehicle routes, etc.), instructions (e.g., software or firmware for commanding the off-road vehicle, etc.), and any other suitable data.

While the off-road vehicle control system 26 includes the off-road vehicle controller 50 and the correction path controller 52, it should be appreciated that in alternative embodiments, the control system 26 may include the base station controller 74. For example, in certain embodiments, control functions of the control system 26 may be distributed between the off-road vehicle controller 50, the correction path controller 52, and the base station controller 74. In further embodiments, the base station controller 74 may perform a substantial portion of the control functions of the control system 26. For example, in certain embodiments, the transceiver 28 may output signals to the transceiver 30. In such embodiments, the transceiver 30 may output corresponding signals to the base station controller 74, and the base station controller 74 may determine the appropriate action based on the current state of the off-road vehicle 10 and output a signal indicative of the appropriate action. For example, the controller 74 may output a signal to the user interface 80, instructing the user interface 80 to alert the operator of the off-road vehicle's divergence from the planned path 18. In addition, the controller 74 may output instructions to the off-road vehicle controller 50 (e.g., via the transceivers 28 and 30), instructing the off-road vehicle 10 and/or the agricultural implement to perform certain operations (e.g., steering control and/or speed control) to guide the off-road vehicle 10 along the planned path or to guide the off-road vehicle 10 back to the planned path.

The control system 26 may receive points or curves (e.g., way points or breadcrumbs) and generate a planned path through those points. The control system 26 may then guide the off-road vehicle 10 along paths (e.g., planned path, correction path, blended path, etc.) that are continuous and include one or more clothoid segments. The off-road vehicle 10 may not be capable of following a planned path that includes discontinuities in position, velocity, or acceleration. Accordingly, the vehicle paths received or generated by the vehicle control system 26 may be continuous in terms of position, velocity, and acceleration. For example, the planned vehicle path does not include instantaneous step changes in position, velocity, and acceleration. The path may or may not include a series of clothoid segments that are continuously determined based on a number (e.g., 1, 3, 5, 10, etc.) of the received points ahead of the vehicle, and a number (e.g., 1, 3, 5, 10, etc.) of the received points behind the vehicle. The final position, heading, and curvature at the end of one clothoid segment matches the starting position, heading, and curvature of the following clothoid segment. Furthermore, vehicle constraints, such as minimum turning radius and maximum turning rate (e.g., maximum slew rate) are considered in generating paths that the vehicle 10 may follow. Accordingly, the paths generated may be continuous to the second derivative of position ("C2 continuity") and are within the capabilities of the vehicle 10. Furthermore, when generating paths, it may be beneficial to consider the cost of each path in order to generate an efficient path that the vehicle 10 is capable of following.

Figure 3:
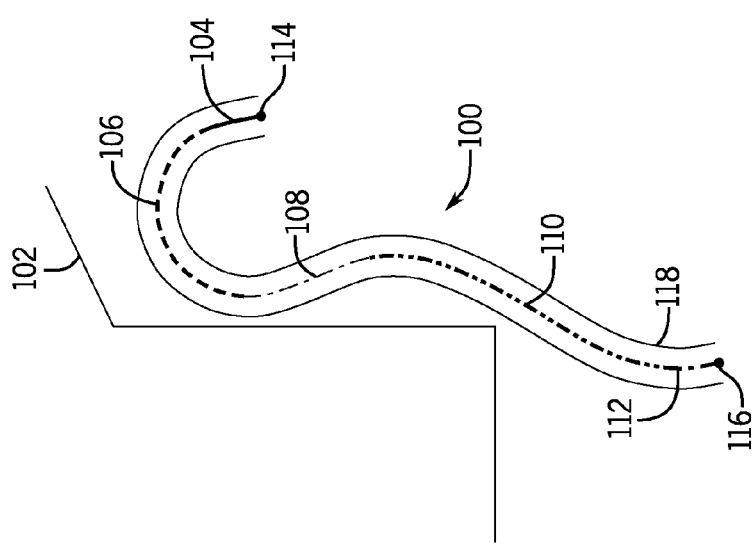
FIG. 3 is a top-down view of a C2 continuous segment of a planned off-road vehicle path.

FIG. 3 is a top-down view of a segment 100 of a planned off-road vehicle path. In the illustrated embodiment, the path segment 100 is a path through an end-of-row turn that connects the end of one row to the beginning of another row, while avoiding contact with a boundary 102 (e.g., a fence).

In the present embodiment, the path segment 100 includes five discrete clothoid segments 104, 106, 108, 110, 112 that combine to form a continuous path from a starting point 114 to an end point 116. Clothoid segments, also referred to as Euler spirals, are defined as curves with a curvature that changes linearly along the curve length. Put another way, the rate of curvature c for a given clothoid is constant. Clothoids are C2 continuous and may take into account physical constraints, such as minimum turning radius and maximum turning rate of the vehicle. A clothoid may be defined as a curve having a curvature that varies linearly with curve length. The velocity ($\dot{x}(s)$, $\dot{y}(s)$) at a distance s along the clothoid, may be described by the following equations:

$$\dot{x}(s) = \cos\left(\frac{\sigma}{2}s^2 + \kappa_i s + q_i\right), \quad (1)$$

$$\dot{y}(s) = \sin\left(\frac{\sigma}{2}s^2 + \kappa_i s + q_i\right), \quad (2)$$

where $q_i$ is the initial heading, $\kappa_i$ is the initial curvature, and $\sigma$ is the rate of change of the curvature with respect to s, the distance along the clothoid. The curvature as a function of s may be described by:

$$\kappa = \sigma s + \kappa_i, \quad (3)$$

The heading as a function of s may be described by:

$$q = \frac{\sigma}{2}s^2 + \kappa_i s + q_i. \quad (4)$$

Thus, the position (x(s), y(s)) may be described by:

$$x(s) = x_i + \int_0^s \cos\left(\frac{\sigma}{2}\tau^2 + \kappa_i \tau + q_i\right) d\tau, \text{ and} \quad (5)$$

$$y(s) = y_i + \int_0^s \sin\left(\frac{\sigma}{2}\tau^2 + \kappa_i \tau + q_i\right) d\tau, \quad (6)$$

where $\tau$ is path length. Thus, a clothoid segment may be based on initial position, $x_i$ and $y_i$, initial heading, $q_i$, initial curvature, $\kappa_i$, rate of curvature, $\sigma$, and path length, s. The capabilities of the vehicle 10 (e.g., minimum turning radius, maximum turning rate) may be taken into account when determining the parameters of the clothoid segments 104, 106, 108, 110, 112. For example, the maximum turning rate (e.g., maximum slew rate) of the vehicle may be proportional to a maximum value for rate of curvature $\sigma$. The minimum turning radius may determine a maximum value for curvature $\kappa$. It should be appreciated that segments having a constant curvature are clothoids with a rate of curvature $\sigma$ of zero. Similarly, straight line segments are clothoid segments in which both the curvature $\kappa$ and the rate of curvature $\sigma$ are zero. Thus, straight line segments, segments of constant curvature, and segments having a constant rate of curvature may all be defined as clothoid segments. Accordingly, the path segment 100 of five clothoid segments 104, 106, 108, 110, 112 may be parameterized in a single vector:

$$z = [x_0, y_0, q_0, \kappa_0, \sigma_0, s_0, x_1, y_1, q_1, \kappa_1, \sigma_1, s_1, \ldots, x_4, y_4, q_4, \kappa_4, \sigma_4, s_4]^T \quad (7)$$

Figure 4:
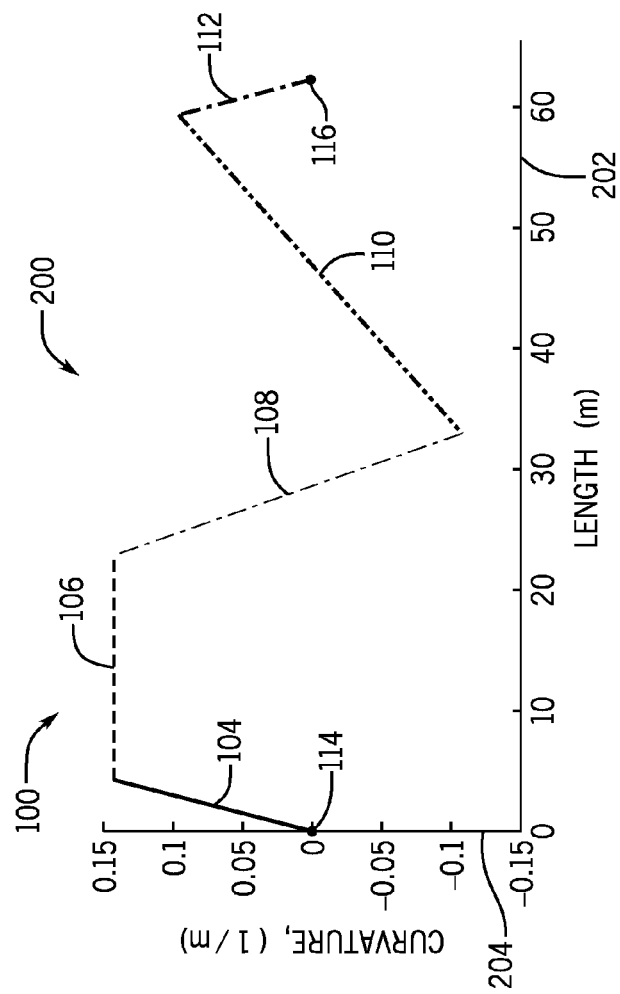
FIG. 4 is a graph of the curvature of the C2 continuous vehicle path segment shown in FIG. 3, as a function of path length.

The off-road vehicle control system 26 or the base station controller 74 may adjust one or more of the initial position x; y; the initial heading q; the initial curvature $\kappa$, the rate of curvature $\sigma$, and the path length s of each segment 104, 106, 108, 110, 112, such that the path segment 100 is C2 continuous. The path segment 100 is C2 continuous when the final position, the final heading, and the final curvature at the end of one segment (e.g., the first segment 104) matches the initial position, the initial heading, and the initial curvature at the start of the proceeding segment (e.g., the second segment 106). As shown in FIG. 4, the end of each segment 104, 106, 108, 110 aligns with the beginning of the subsequent segment 106, 108, 110, 112.

If the vehicle 10 is at the starting point 114, then the current vehicle state may be used as the initial position, initial heading, and initial curvature of the first clothoid segment 104. Conversely, the parameters of the last segment 112 may be adjusted such that the final position, final heading, and final curvature of the last segment 112 match the final position, final heading, and final curvature of the desired exit state. As previously discussed, the parameters of each segment 104, 106, 108, 110, 112 are adjusted in such a way that the rate of curvature $\sigma$ does not exceed the vehicle's maximum turning rate, and/or the curvature $\kappa$ does not fall below the minimum turning radius of the vehicle. Additionally, a minimum segment length (e.g., 10 centimeters) may be used such that the path lengths of each segment 104, 106, 108, 110, 112 remains above the minimum segment length.

The path segment 100 may also be configured to avoid boundaries 102 when generating clothoid segments 104, 106, 108, 110, 112 of the path segment 100 and adjusting the parameters of the segments. In some applications, the implement 12 may be wider than the vehicle 10. In such embodiments, the path segment 100 may include a buffer region 118 on either side of the path segment 100 that may be as wide as or wider than the implement 12, such that the implement 12 may be capable of traversing the path segment 100 without coming into contact with the boundary 102.

FIG. 4 is a graph 200 of the curvature $\kappa$ of the C2 continuous path segment 100 shown in FIG. 3, as a function of path lengths. The x-axis 202 represents distance along the C2 continuous path segment 100 in meters. The y-axis 202 represents the curvature, $\kappa$, in 1/meters at a point along the length of the C2 continuous path segment 100. Note that the curvature $\kappa$ of the path segment 100 is continuous along its length. That is, the curvature $\kappa$ at the end of one segment matches the curvature at the beginning of the proceeding segment. As previously discussed, a C2 continuous path 100 is drivable by the off-road vehicle because it does not include instantaneous changes in curvature.

Though the illustrated path segment 100 is for an end of row turn, it should be understood that similar methods may be used to generate a C2 continuous path for performing any maneuver in a field and that the disclosed techniques are not limited to end-of-row turns. Similarly, though the illustrated path segment 100 includes five segments, the same techniques may be applied to create a path than joins any number of segments. For example, in some embodiments, the path segment 100 may be made of any number of segments (e.g., 1, 2, 3, 4, 5, 6, 7, 8, 9, 10, 11, 12, 13, 14, 15, 16, 17, 18, 19, 20, 50, 100 segments or more).

As previously discussed, the path may be generated by components on the off-road vehicle. The path may pass through points or curves (e.g., breadcrumbs or waypoints) communicated to the off-road vehicle (e.g., via the transceivers). For example, the path may pass through one point behind the vehicle and five points ahead of the vehicle. In further embodiments, the path may be generated ahead of time and stored by the base station (e.g., in the memory component or storage device) and communicated to the off-road vehicle (e.g., via the transceivers). To determine an efficient path among a group of candidate C2 continuous paths, a cost may be assigned to each path. The costs may include time to complete the path, fuel consumed by the vehicle while traversing the path, and wear on the vehicle while traversing the path. The costs may be corresponds to path length, path shape (curvature and rate of curvature), and topological and/or physical properties of the surfaces traversed.

For example, the time it takes for the vehicle to traverse a path depends on the speed that the vehicle moves along the path. The speed of the vehicle is not explicitly defined by the clothoid spline vector of Equation 7, however the speed of the vehicle may be based on the maximum vehicle speed, the maximum steering rate, the maximum centripetal acceleration (e.g., to control slippage, to enhance stability, etc.), or a combination thereof. Once the desired speed based on these factors is determined, the time of travel for the vehicle along the path may be determined. The length and shape of the path may be adjusted in order to obtain an efficient path.

Figure 5:
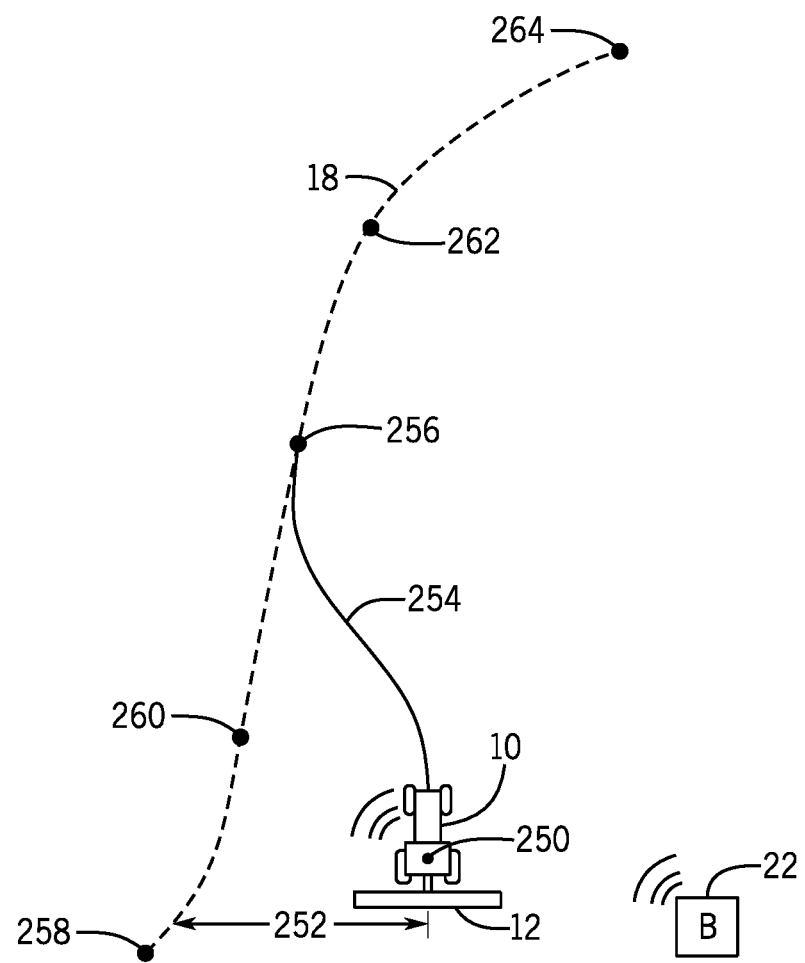
FIG. 5 is a schematic diagram of an off-road vehicle disposed at a location a distance away from the planned path and a correction path to a point on the planned path.

The path may be a continuous line or a collection of discrete points. As described above, the planned path may be generated by the control system on the off-road vehicle, or generated elsewhere (e.g., the base station) and stored on the vehicle. In some instances, the vehicle may diverge from the planned vehicle path. This divergence may be due to operator inputs, field conditions, or some other reason. In such instances, the off-road vehicle may generate an additional path from its current position to a point on the planned path. FIG. 5 is a schematic diagram of an off-road vehicle 10 disposed at a location 250 a distance 252 (e.g., lateral separation distance) away from the planned path 18 and a correction path 254 to a point 256 on the planned path 18. The planned path 18 passes through a number of points 256, 258, 260, 262, 264, (e.g., waypoints or breadcrumbs) which were received from the base station 22. In other embodiments, curves may be received from the base station 22. As will be described in more detail with regard to FIG. 6, the correction path controller on the off-road vehicle 10 continuously (e.g., every 0.1, 0.2, 0.5, 1, 1.5, 2, 3, 4, 5, 7, 10 seconds, etc.) updates the correction path 254 from the current location 250 to one of the points 256 on the planned path 18. The primary controller weights the planned path 18 and the correction path 254 based on the error (e.g., 95/5, 90/10, 80/20, 70/30, 60/40, 50/50, 40/60, 30/70, 20/80, 10/90, 5/95, etc.) which corresponds to the distance 252 between the current vehicle location 250 and the planned path 18. If the vehicle 10 is on or very close to the planned path 18, the primary controller will give very little or no weight to the correction path 254. If the distance 252 between the vehicle 10 and the planned path 18 is large, the primary controller will give significant weight to the correction path 254. The weighted blend of the planned path 18 and the correction path 254 (or the control signals for each path 10, 254) results in a blended path. In some embodiments, the blended path may be defined as the path the vehicle 10 travels using a control signal that blends the control signals that correspond to the planned path 18 and the correction path 254. In other embodiments, the blended path may be defined by blending the planned path 18 and the correction path 254. In some embodiments, the correction path 254 or the blended path may pass through the next point 260 along the path 18, or another point along the path 18. In other embodiments, for example, the embodiment illustrated in FIG. 5, the vehicle may skip one or more of the next points 260 because to pass through the next points would requires a severe correction. The primary controller controls (e.g., according to the blended control signal) the various systems of the vehicle (e.g., the steering control system and the speed control system) to guide the vehicle 10 along the blended path back to the planned path 18.

Figure 6:
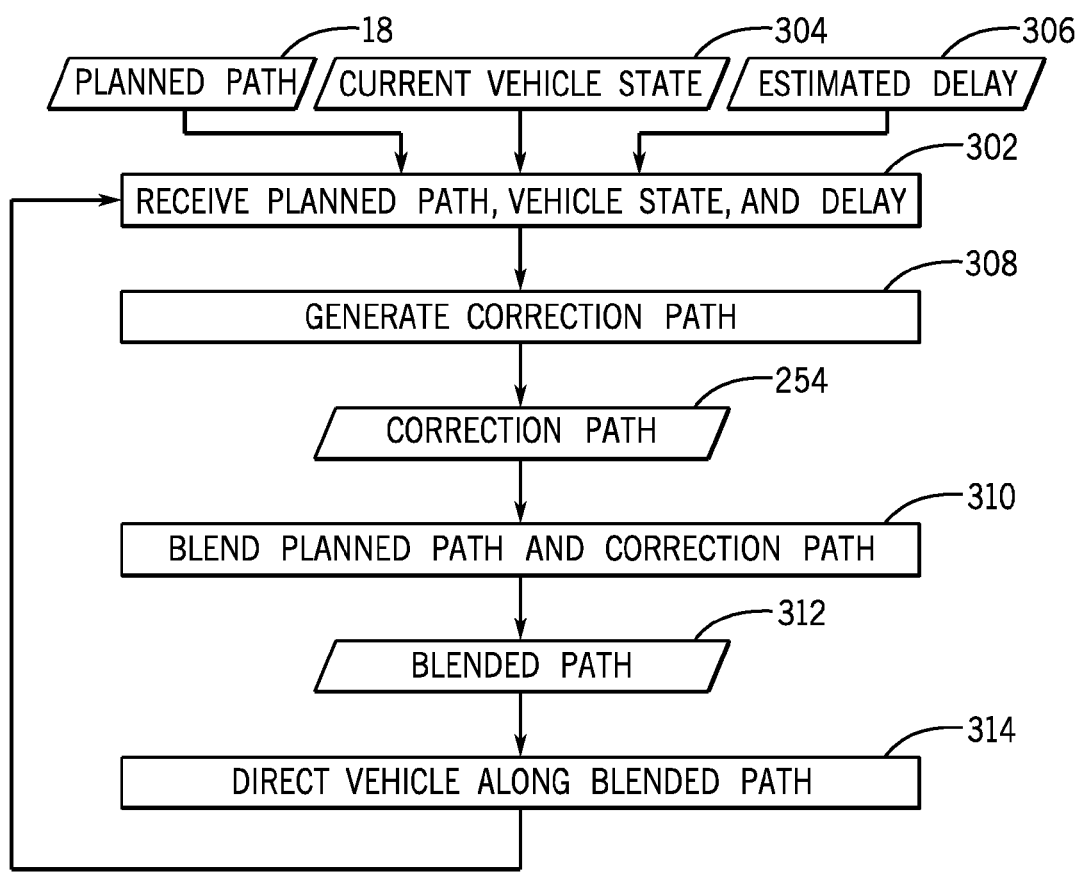
FIG. 6 is a flow chart of a process for returning the off-road vehicle to the planned path.

FIG. 6 is a flow chart of a process 300 for returning the off-road vehicle to the planned path 18. As previously discussed, a planned path is generated based on points (e.g., waypoints or breadcrumbs) received from the base station. In block 302, the planned path 18, the current vehicle state 304, and the estimated delay 306 in the control loop are received. In other embodiments, the control system of the off-road vehicle may receive the planned path 18 from the base station or from some other source. In some embodiments, the planned path 18 may be stored in memory within the control system of the off-road vehicle. The current vehicle state 304 may be received from the spatial locating device or determined based on outputs from the spatial locating device. In some embodiments, the current vehicle state 304 may also be received from the base station. The estimated delay 306 represents the delay in the control loop. Based on the estimated delay 306 and the current vehicle state 304 (e.g., the position, speed, and heading of the vehicle), the control system of the off-road vehicle can predict the position of the off-road vehicle at the time the various systems of the off-road vehicle (e.g., steering control system and speed control system) are actuated, such that control signals are generated for a predicted future vehicle state rather than the current vehicle state.

In block 308, the correction path 254 is generated to direct the off-road vehicle from its current position to a point on the planned path 18 ahead of the off-road vehicle in the direction of travel. The correction path 254 may pass through a point along the vehicle path behind the off-road vehicle, and one or more points ahead of the off-road vehicle along the planned path 18, which were received from the base station. The correction path 254 may include one or more clothoid segments and may have a continuous curvature (e.g., the correction path 254 may be C2 continuous). Similarly, the correction path 254 may be generated such that the transition between the correction path 254 and the planned path 18 is C2 continuous such that the vehicle can resume following the planned path 18 upon reaching the planned path 18. The correction path 254 may be generated by the correction path controller of the off-road vehicle, by another component on the off-road vehicle, by the base station, by some other device, or a combination thereof. The correction path 254 may or may not be generated using techniques similar to the vehicle path generation techniques discussed with regard to FIGS. 3 and 4.

In block 310, the correction path 254 may be blended with the planned path 18 to form a blended path 312. It should be appreciated that the control signals corresponding to the correction path 254 and the planned path 18 may be blended, or the paths themselves may be blended together. Accordingly, the blended path 312 may be indirectly defined as the path traveled by the vehicle when the blended control signal is used to guide the vehicle. In other embodiments, the blended path may be mathematically defined by blending the planned path 18 and the correction path 254. The blend between the correction path 254 and the planned path may be based at least in part on assigned weights, which are based at least in part on the error in the vehicle's location from the planned path 18. For example, if the vehicle is a substantial distance away from the planned path 18, the correction path 254 may be assigned substantially more weight than the planned path 18, such that the blended path 312 is closer to the correction path 254 than the planned path 18. If the vehicle is on or close to the planned path 18, the correction path 254 may be given very little weight compared to the planned path 18, such that the blended path 312 is closer to the planned path 18 than the correction path. For example, the planned path 18 and the correction path 254 may be weighted 95/5, 90/10, 80/20, 70/30, 60/40, 50/50, 40/60, 30/70, 20/80, 10/90, 5/95, etc. to form the blended path 312. The error may be as little as a few inches, and as large as many feet. As with the correction path 254, the blended path 312 may pass through a point along the vehicle path behind the off-road vehicle, and one or more points ahead of the off-road vehicle along the planned path 18. The blended path 312 may include one or more clothoid segments and may have a continuous curvature (e.g., the blended path 312 may be C2 continuous). The transition between the blended path 312 and the planned path 18 may be C2 continuous such that the vehicle resumes following the planned path 18 upon reaching the planned path 18.

In block 314, the off-road vehicle is directed along the blended path 312 (e.g., using the blended control signal) to a point along the planned path 18, ahead of the off-road vehicle. For example, the off-road vehicle control system may control the steering control system and the speed control system of the off-road vehicle to guide the off-road vehicle along the blended path 312 back to the planned path 18. The process 300 may then return to block 302 and monitor the current vehicle state 304 versus the planned path 18. The process 300 may continually update the correction path 254, the blended path 312, or both based on the position of the off-road vehicle relative to the planned path 18.

Autonomous or semi-autonomous off-road vehicles may diverge from a planned path due to operator inputs, field conditions, obstacles, or for some other reason. Vehicle path generating techniques may be used to generate a correction path back to the planned path, and blend the correction path and the planned path to establish a blended path. The vehicle may then be directed along the blended path back to the planned path. The correction path and and/or the blended path may include one or more clothoid segments and may be C2 continuous, or otherwise have continuous curvature such that the path back to the planned path is drivable by the vehicle.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A swath tracking system for an off-road vehicle, comprising:
    a control system comprising a processor and a memory and configured to:
        receive a plurality of vehicle location points and a current vehicle state, wherein the current vehicle state comprises a current vehicle location;
        generate a planned vehicle path through one or more of the plurality of vehicle location points;
        generate a correction path from the current vehicle location to a point along the planned vehicle path ahead of the current vehicle location along a direction of travel;
        generate a blended path by blending the planned vehicle path and the correction path based at least in part on an assigned weight, wherein the assigned weight is based at least in part on a heading error, a distance between the current vehicle location and the planned path, or a combination thereof; and
        guide the off-road vehicle along the blended path.

2. The swath tracking system of claim 1, wherein the planned vehicle path and the correction path each comprise one or more clothoid segments.

3. The swath tracking system of claim 2, wherein the planned vehicle path and the correction path each have continuous curvatures.

4. The swath tracking system of claim 3, wherein the planned vehicle path and the correction path are each C2 continuous.

5. The swath tracking system of claim 1, wherein the current vehicle state comprises the current vehicle location, a current vehicle velocity, a current vehicle heading, and a current vehicle curvature.

6. The swath tracking system of claim 1, wherein the current vehicle state is determined based at least in part on outputs from a spatial locating device.

7. The swath tracking system of claim 1, wherein guiding the off-road vehicle along the blended path comprises controlling a steering control system and a speed control system of the off-road vehicle.

8. The swath tracking system of claim 1, wherein the control system is configured to receive an estimated control loop delay, and use the estimated control loop delay in generating the correction path, the blended path, or both.

9. An off-road vehicle, comprising:
    a steering control system configured to control a direction of travel of the off-road vehicle;
    a speed control system configured to control a speed of travel of the off-road vehicle;
    a spatial locating device configured to determine a current vehicle state of the off-road vehicle; and
    a control system configured to:
        receive a plurality of vehicle location points;
        generate a planned vehicle path through one or more of the plurality of vehicle location points;
        receive the current vehicle state from the spatial locating device, wherein the current vehicle state comprises a current vehicle location;
        generate a correction path from a current vehicle location to one of the plurality of vehicle location points along the planned vehicle path ahead of the current vehicle location along a direction of travel;
        generate a blended path by blending the planned vehicle path and the correction path based at least in part on an assigned weight, wherein the assigned weight is based at least in part on heading error, a distance between the current vehicle location and the planned path, or a combination thereof; and
        control the steering control system and the speed control system to guide the off-road vehicle along the blended path.

10. The off-road vehicle of claim 9, wherein the planned vehicle path and the correction path each comprise one or more clothoid segments.

11. The off-road vehicle of claim 10, wherein the planned vehicle path and the correction path each have a continuous curvature.

12. The off-road vehicle of claim 11, wherein the planned vehicle path and the correction path are each C2 continuous.

13. The off-road vehicle of claim 9, wherein the control system is configured to receive an estimated control loop delay, and use the estimated control loop delay in generating the correction path, the blended path, or both.

14. The off-road vehicle of claim 9, wherein the correction path passes through at least one of the plurality of vehicle location points behind the off-road vehicle along the direction of travel and through at least one of the plurality of vehicle location points ahead of the off-road vehicle along the direction of travel.

15. The off-road vehicle of claim 9, wherein the current vehicle state comprises the current vehicle location, a current vehicle velocity, a current vehicle heading, and a current vehicle curvature.

16. A method, comprising:
    receiving, via a control system, a plurality of vehicle location points, a current vehicle state, and a feedback loop delay time, wherein the current vehicle state comprises a current vehicle location;

generating, via the control system, a planned vehicle path through one or more of the plurality of vehicle location points;

generating, via the control system, a correction path from the current vehicle location to one of the plurality of vehicle location points along the planned vehicle path ahead of the current vehicle location along a direction of travel;

generating, via the control system, a blended path by blending the planned vehicle path and the correction path based at least in part on an assigned weight, wherein the assigned weight is based at least in part on heading error, a distance between the current vehicle location and the planned path, or a combination thereof; and guiding, via the control system, the off-road vehicle along the blended path.

17. The method of claim 16, wherein the planned vehicle path and the correction path each comprise one or more clothoid segments.

18. The swath method of claim 17, wherein the planned vehicle path and the correction path are each C2 continuous.

19. The method of claim 16, wherein the current vehicle state comprises a current vehicle velocity, a current vehicle heading, and a current vehicle curvature.

20. The method of claim 16, wherein the correction path passes through at least one of the plurality of vehicle location points behind the off-road vehicle along the direction of travel and through at least one of the plurality of vehicle location points ahead of the off-road vehicle along the direction of travel.

* * * * *